United States Patent
Qin

(10) Patent No.: US 8,531,306 B2
(45) Date of Patent: Sep. 10, 2013

(54) ENERGY-SAVING CONTROL CIRCUIT FOR TURNING OFF A POWER SUPPLY FOR AN APPLIANCE

(75) Inventor: Bing Qin, Zhejiang (CN)

(73) Assignee: Ningbo Huadian Envirotech Co., Ltd., Ningbo, Zhejiang (CN)

( * ) Notice: Subject to any disclaimer, the term of this patent is extended or adjusted under 35 U.S.C. 154(b) by 462 days.

(21) Appl. No.: 12/901,414

(22) Filed: Oct. 8, 2010

(65) Prior Publication Data

US 2011/0121955 A1     May 26, 2011

(30) Foreign Application Priority Data

Nov. 26, 2009   (CN) ........................ 2009 1 0154315

(51) Int. Cl.
  *G08B 21/00*   (2006.01)
(52) U.S. Cl.
  USPC ............................ 340/664; 340/657; 307/125
(58) Field of Classification Search
  USPC .............. 340/635, 657, 664, 539.3; 307/112, 307/125, 131; 700/297, 298; 361/1; 320/111
  See application file for complete search history.

(56) References Cited

U.S. PATENT DOCUMENTS

2011/0050170 A1 * 3/2011 Eastlack ..................... 320/111
2011/0093131 A1 * 4/2011 Biswas ....................... 700/296

\* cited by examiner

*Primary Examiner* — Jeffery Hofsass
(74) *Attorney, Agent, or Firm* — Global IP Services; Tianhua Gu

(57) ABSTRACT

This invention related to a kind of energy-saving control circuit connected between the electrical appliance and commercial power for turning on and off the power supply of the electrical appliances, said energy-saving control circuit comprises a relay control circuit for connecting and disconnecting the power supply of the electrical appliance; a main control module; a power conversion module; a circuit for collecting working current signals; said energy-saving control circuit further features: comprising at least a remote induction circuit at least provided with features of induction and receiving of remote signals, said remote induction circuit is connected to the main control module, said main control module, after said remote induction circuit received remote signals, will export control signals to the relay control circuit for connecting the power supply of the electrical appliance. Compared with existing technologies, the user only needs to approach the external micro induction transmitter for human body to "arouse" the energy-saving control circuit, and then the this electrical appliance can be turned on, which complies with the habit of most users.

14 Claims, 4 Drawing Sheets

ENERGY-SAVING CONTROL CIRCUIT FOR TURNING OFF A POWER SUPPLY FOR AN APPLIANCE

CROSS REFERENCE TO RELATED APPLICATIONS

This application claims the priority of the Chinese patent application No. 200910154315.0 filed on Nov. 26, 2009, which application is incorporated herein by reference.

FIELD OF THE INVENTION

This invention relates to an energy-saving control circuit for electrical appliances.

BACKGROUND OF THE INVENTION

Most electrical appliances, such as TV sets and air conditioners, will have the standby power consumption of about 10 w after being shut down with the controller, so will desktop computers. To thoroughly eliminate such standby power consumption, it is required to completely shut down the power supply of the electrical appliance; however, after the power supply is completely shut down, it is required to turn on the power supply before restarting the electrical appliance, which does not comply with the habit of most people.

Therefore, people have invented power-saving switches or power-saving sockets, most commercially available power-saving switches or power-saving sockets adopt mutual-induction transformers, which first compare the start-up current of the electrical appliance with the standby current of the same, and then completely shut the power supply through a relay control circuit for connecting or disconnecting the power supply of the electrical appliance, thus achieving the purpose of eliminating standby power consumption; however, such a power-saving switch or power-saving socket will need complicated procedure to connect the power supply of the electrical appliance:

For example, the power-saving socket for TV sets generally adopts a 2 m multiple-core cord which connects an infrared receiver with the power-saving socket, in practice, it is required to fix the infrared receiver before the TV set first, when the user press the power button on the controller for the first time, infrared receiver will only make the relay control circuit of the power-saving socket to connect the power supply, and the TV set will be really started after the user press the controller for the second time power button on the;

The power-saving socket for computers generally adopts a 2 m multiple-core cord which connects a touch button with the power-saving socket, in practice, it is required to fix the touch button before or near the computer, to start the computer, the user needs to press the touch button once to make the relay control circuit of the power-saving socket to connect the power supply to set the computer at the standby status, and the computer will be really started after the user press the power button of the computer;

Other electrical appliances will also need complicated procedure to make the relay control circuit connect the power supply, although the power-saving sockets mentioned above do same power-saving, they use multiple-core cords which are both expensive and too thick to be fixed, moreover, they looks not graceful, and more important, when such sockets are used, although the shutdown of the electrical appliances can be in one step, the startup can only be done in two steps, which does not comply with the habit of most people.

SUMMARY OF THE INVENTION

The $1^{st}$ purpose of this invention is to provide a kind of easily operated, economical and energy-saving control circuit that can make the relay control circuit connect the power supply of the electrical appliance targeting at the existing technologies mentioned above.

The $2^{nd}$ purpose of this invention is to provide a micro induction transmitter for human body used with said energy-saving control circuit targeting at the existing technologies mentioned above.

The technical solution for this invention to achieve the first purpose is: an energy-saving control circuit connected between an electrical appliance and commercial power for turning on and off the power supply of the electrical appliances, comprising:

A relay control circuit, at least comprising a relay, 2 contacts of said relay connected in series between the electrical appliance and commercial power for connecting or disconnecting the power supply of the electrical appliance;

A main control module, the signal output port of which being connected to the signal control port of said relay control circuit for exporting control signals to said relay control circuit for connecting or disconnecting the power supply of the electrical appliance;

A power conversion module, the input port of which being connected to commercial power, the output port of which being connected to the power input port of said main control module and the input port of said relay control circuit for generating DC power supply to be supplied to said main control module and said relay control circuit;

A circuit for collecting working current signals of the electrical appliance, the input port of which being connected to the electrical appliance for collecting real-time working current of the electrical appliance; the output port of which being connected to the main control module;

Said energy-saving control circuit further features: comprising at least a remote induction circuit with features of induction and transmitting and receiving remote signals, said remote induction circuit being connected to said main control module, which, according to the remote signals received by said remote induction circuit, outputs control signals to said relay control circuit, which will then connect or disconnect the power supply of the electrical appliance.

As an improvement, said circuit for collecting working current signals adopts a constantan resistor and a current signal amplifying circuit, the first end of said constantan resistor is connected to the N-line of the commercial power after being connected to a fuse, the $2^{nd}$ end of said constantan resistor is connected to one contact of the relay in said relay control circuit, and the other contact of said relay is connected to the N input port of the electrical appliance, the L input port of the electrical appliance is connected to L-line of the commercial power; the 2 input ports of said current signal amplifying circuit are connected to the $1^{st}$ end and $2^{nd}$ ends of said constantan resistor for amplifying the current through said constantan resistor, the output port of said current signal amplifying circuit is connected to the signal input port of said main control module.

Said main control module comprises a micro controller with storage function, the control port of said relay is connected to the control signal output port of said micro controller.

Said remote induction circuit is a wireless receiving module working with said induction transmitter for human body and provided with at least the feature of wireless receiving.

As a further improvement, said micro induction transmitter for human body comprises a housing being provided with an embedded thermal-discharge infrared inductor, the signal output port of said thermal-discharge infrared inductor is connected to the signal input port of an induction signal processing module, the signal output port of said induction signal processing module is connected to a remote transmitting module at least provided with the function of remote signal transmittance.

Preferably, said remote transmitting module is a wireless RF transmitting module, correspondingly, said wireless receiving module adopts wireless RF receiving module to form the wireless RF remote induction circuit.

Possibly, said remote induction circuit adopts a wireless transmitting and receiving module working with the induction transmitter for human body to make wireless receiving and transmitting modules communicate with each other and form the network. This facilitate "arousing" the energy-saving control circuit with the induction transmitter for human body to make the electrical appliance in the standby status, which is applicable to long-distance or large-scope remote control and thus the scope of application is broadened.

As a further improvement, said induction transmitter for human body comprises a housing provided with a thermal-discharge infrared inductor, the signal output port of which is connected to the signal input port of the induction signal processing module, the signal output port of which is connected to a remote transmitting module at least provided with transmitting function.

Preferably, said remote transmitting module is a wireless RF transmitting module, correspondingly, said wireless receiving and transmitting module adopts wireless RF receiving and transmitting modules to form the wireless RF remote induction circuit.

As an improvement, said wireless receiving and transmitting modules can communicate and form a network with each other.

Possibly, said remote induction circuit is a wireless transmitting and receiving module working with the human body induction transmitting and receiving module and provided with wireless transmitting and receiving functions.

As a further improvement, said human body induction transmitting and receiving module comprises a housing provided with a thermal-discharge infrared inductor, the signal output port of which is connected to the signal input port of the induction signal processing module, the signal output port of which is connected to a remote transmitting and receiving module at least provided with transmitting and receiving functions.

Preferably, said remote transmitting and receiving module is a wireless RF receiving and transmitting module, correspondingly, said wireless transmitting and receiving module adopts wireless RF receiving and transmitting module to form the wireless RF remote induction circuit.

Finally, said human body induction transmitting and receiving module and wireless transmitting and receiving module may communicate with and form a network with each other.

Furthermore, an energy-saving control circuit is provided in said socket, being connected between the electrical appliance and the commercial power for turning on and off the power supply of the electrical appliance.

Compared with existing technologies, this invention is advantageous in that: by providing a remote induction circuit connected with the main control module, the user can "arouse" the energy-saving control circuit only by approaching the external micro induction transmitter for human body to make the electrical appliance in the standby status, only one step is required, which both complies with the habit of most users and saves the cost for multiple-core cords in existing technologies, moreover, with more reasonably and practical structure, it can both save energy and ensure harmonious and graceful appearance of home.

DETAIL DESCRIPTION OF THE INVENTION

The invention will now be described with reference to the drawings.

Figure 1:
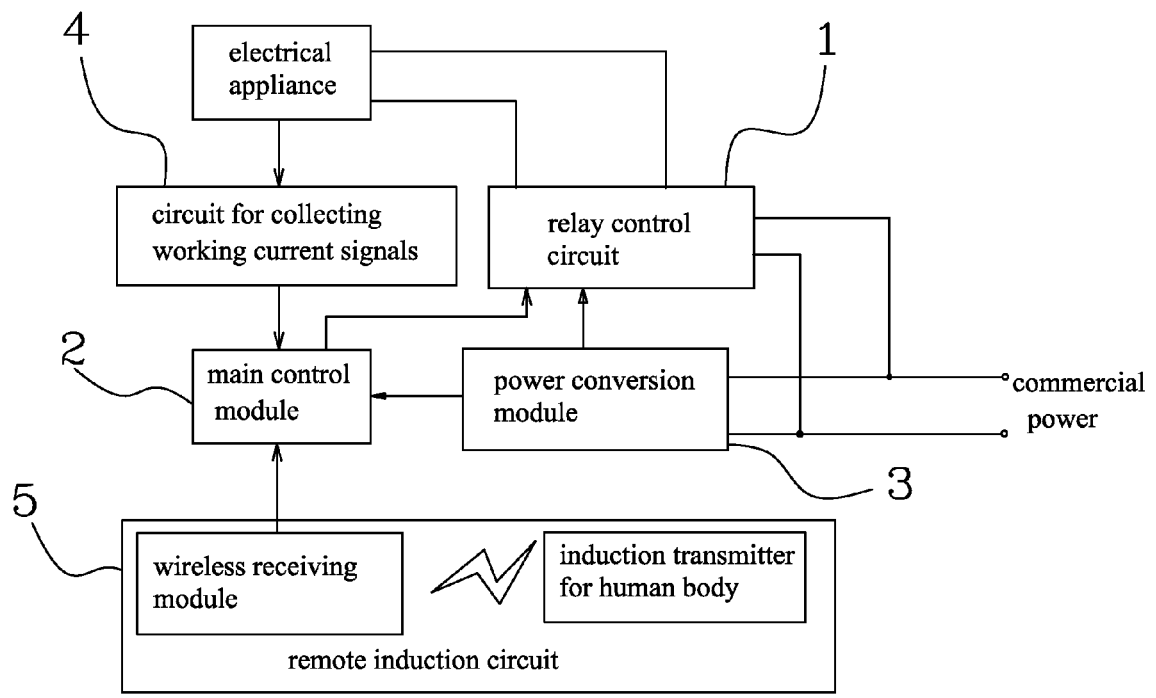
FIG. 1 is a block diagram for the circuit structure of the energy-saving control circuit of the embodiment of this invention.
Figure 2:
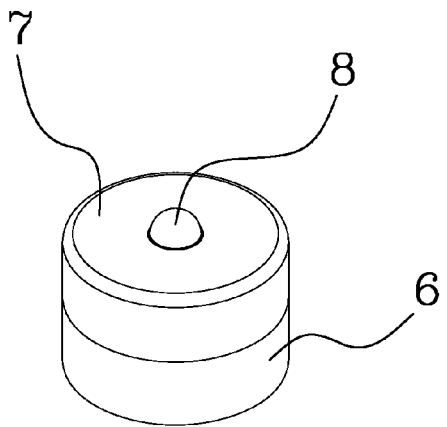
FIG. 2 is a 3D structural diagram for the micro induction transmitter for human body of the embodiment of this invention.

The energy-saving control circuit as shown in FIGS. 1 and 2 connected between the electrical appliance and the commercial power for turning on and off the power supply of the electrical appliance, comprising the relay control circuit 1, the main control module 2, the power conversion module 3, the circuit for collecting working current signals 4 and the remote induction circuit 5.

Figure 3:
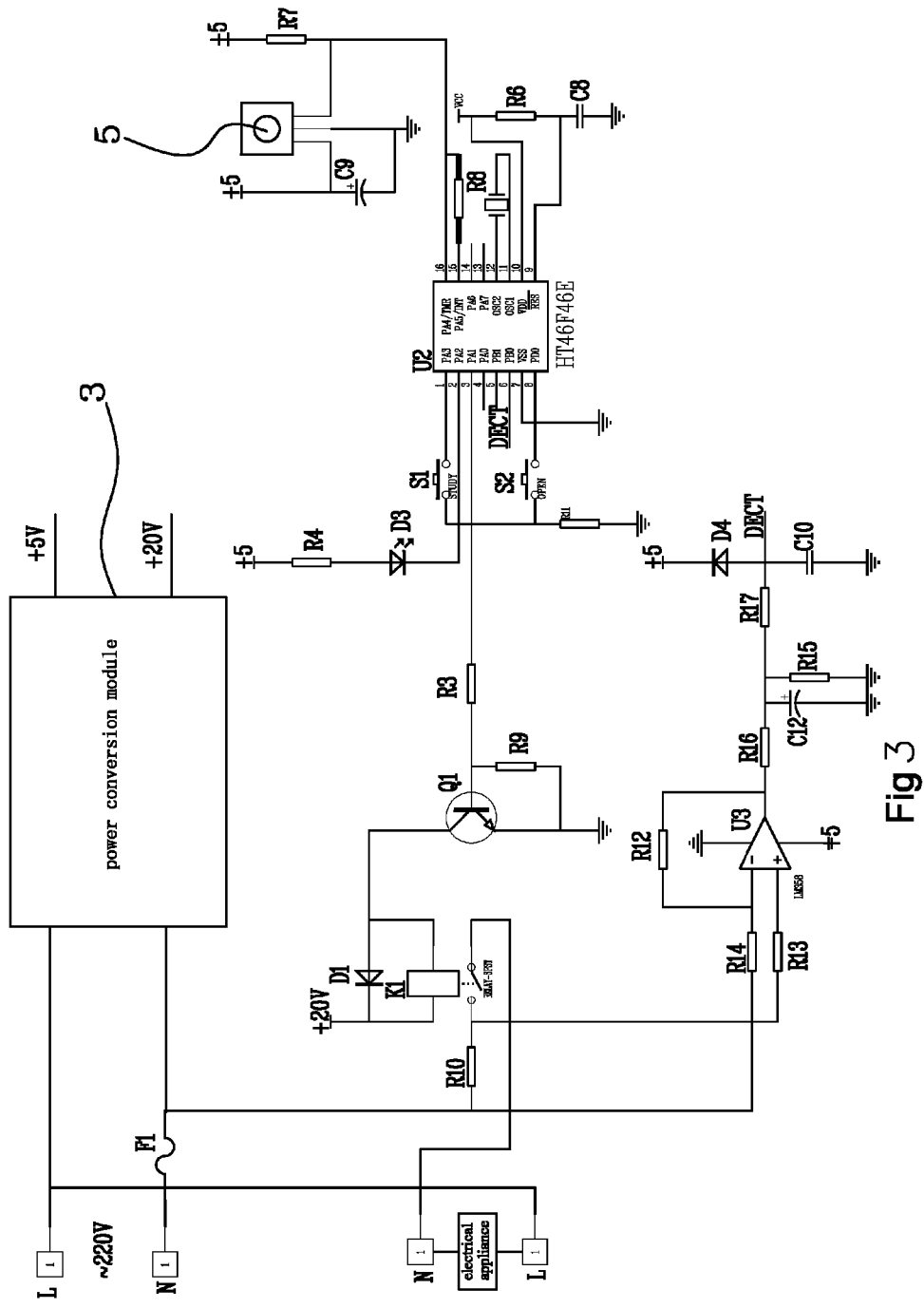
FIG. 3 is a schematic circuit diagram for the energy-saving control circuit of the embodiment of this invention.

Wherein, the relay control circuit 1 for connecting and disconnecting the power supply of the electrical appliance comprises a relay K1; as shown in FIG. 3, the circuit for collecting working current signals 4 consists of a constantan resistor R10 and a current signal amplifying circuit, the first end of the constantan resistor R10 is connected to the N-line of the commercial power after being connected to a fuse F1, the $2^{nd}$ end of the constantan resistorR10 is connected to one contact of the relay K1 in said relay control circuit, and the other contact of said relay K1 is connected to the N input port of the electrical appliance, the control port of the relay K1 is connected to the collector of a audion Q1, the transmitting pole of said audion Q1 is grounded, the base of the audion Q1 is connected to the control signal output port of the main control module after being connected to the $3^{rd}$ resistorR3, and the $9^{th}$ resister R9 is connected between the base of the audion Q1 and ground, the L input port of the power supply of the electrical appliance is connected to L-line of the commercial power; the 2 input ports of said current signal amplifying circuit are connected to the $1^{st}$ end and $2^{nd}$ ends of the constantan resistor R10 for amplifying the current through said constantan resistor, the output port of said current signal amplifying circuit is connected to the signal input port of said main control module. In this embodiment, the current signal amplifying circuit comprises the $13^{th}$ resistor R13, the $14^{th}$ resistor R14, the $12^{th}$ resistor R12, the amplifier U3 of type LM358, the $16^{th}$ resistor R16, the $15^{th}$ resistor R15, the $12^{th}$ capacitor C12, the $17^{th}$ resistor R17, the $4^{th}$ diode D4, the $10^{th}$ capacitor C10, wherein, the first end of the $13^{th}$ resistor R13 is connected to the second end of the constantan resistor R10, the second end of the $13^{th}$ resistor R13 is connected to the input port of the positive pole of said amplifier U3, the first end of the 14$^{th}$ resistor R14 is connected to the first end of the constantan resistor R10, the second end of the 14$^{th}$ resistor R14 is connected to the input port of the negative pole of said amplifier U3, the 12$^{th}$ resistor R12 is connected between the input port and the output port of the negative pole of said amplifier U3, the output port of the amplifier U3 is connected to the first end of the 16$^{th}$ resistor R16, the second end of the 16$^{th}$ resistor R16 is connected to the first end of the 17$^{th}$ resistor R17, the second end of the 17$^{th}$ resistor R17 is connected to the signal input port of the main control module; the positive pole of the 12$^{th}$ capacitor C12 is connected to the first end of the 17$^{th}$ resistor R17, the negative pole of the 12$^{th}$ capacitor C12 is grounded; the first end of the 15$^{th}$ resistor R15 is connected to the first end of the 17$^{th}$ resistor R17, the second end of the 15$^{th}$ resistor R15 is grounded; the negative pole of the 4$^{th}$ diode D4 is connected to the DC voltage of +5V, the positive pole of the 4$^{th}$ diode D4 is connected to the second end of the 17$^{th}$ resistor R17; The first end of the 10$^{th}$ capacitor C10 is connected to the second end of the 17$^{th}$ resistor R17 and the second end of the 10$^{th}$ capacitor C10 is grounded.

The power conversion module 3 adopts the routine power conversion circuit in existing technologies, the input port of which is connected to the commercial power, the output port of which is connected to the power input port of the main control module and the power input port of said relay control circuit for generating the DC power of +5V to be supplied to said main control module and the DC power of +20V to be supplied to said relay control circuit.

The main control module 2 comprises 1 micro controller with storage function, this embodiment adopts HT16F46E microprocessor chip U2, the third pin of the microprocessor chip U2 is connected to the 3$^{rd}$ resistor R3 for exporting control signals to said relay K1 so as to make the relay connect or disconnect the power supply of the electrical appliance: when the third pin of the microprocessor chip U2 exports high level, the high level will pass the resistor R3 to turn on the audion Q1, and thus there's DC current passing the internal loop of the relay K1 to produce the magnetic force, which engages the 2 contacts of the relay K1 and thus provides AV power to the electrical appliance; when the third pin of the microprocessor chip U2 exports low level, the low level will pass the resistor R3 and shut the audion Q1, and thus there's no DC current passing the internal loop of relay K1 and no and magnetic field, and so the 2 contacts of the relay K1 are detached from each other, and thus the AC power is disconnected.

The remote induction circuit 5 adopts the wireless RF receiving module with the existing 2.4 G frequency band, the signal output port of the wireless RF receiving module is connected to the 16$^{th}$ pin of the microprocessor chip U2.

In this embodiment, the circuit for collecting working current signals adopts constantan resistor R10 of milliohm level to detect the startup and standby current of the electrical appliance, compared with mutual-inductance transformer, the constantan resistor R10 is advantageous in smaller size, lower cost, less impacted by temperature, stronger current conduction capacity and the resistance against the high cold-state current impact upon startup of electrical appliances like TV sets or computers. The constantan resistor R10 will transmit the startup and standby current being amplified by the amplifier U3 of the electrical appliance to the microprocessor chip U2 for storage, and the microprocessor chip U2 will compare the current signals to determine whether the electrical appliance is in the standby status, and then the microprocessor chip U2 will export control signals to turn off the relay K1 so as to turn off the power of the electrical appliance.

Figure 4:
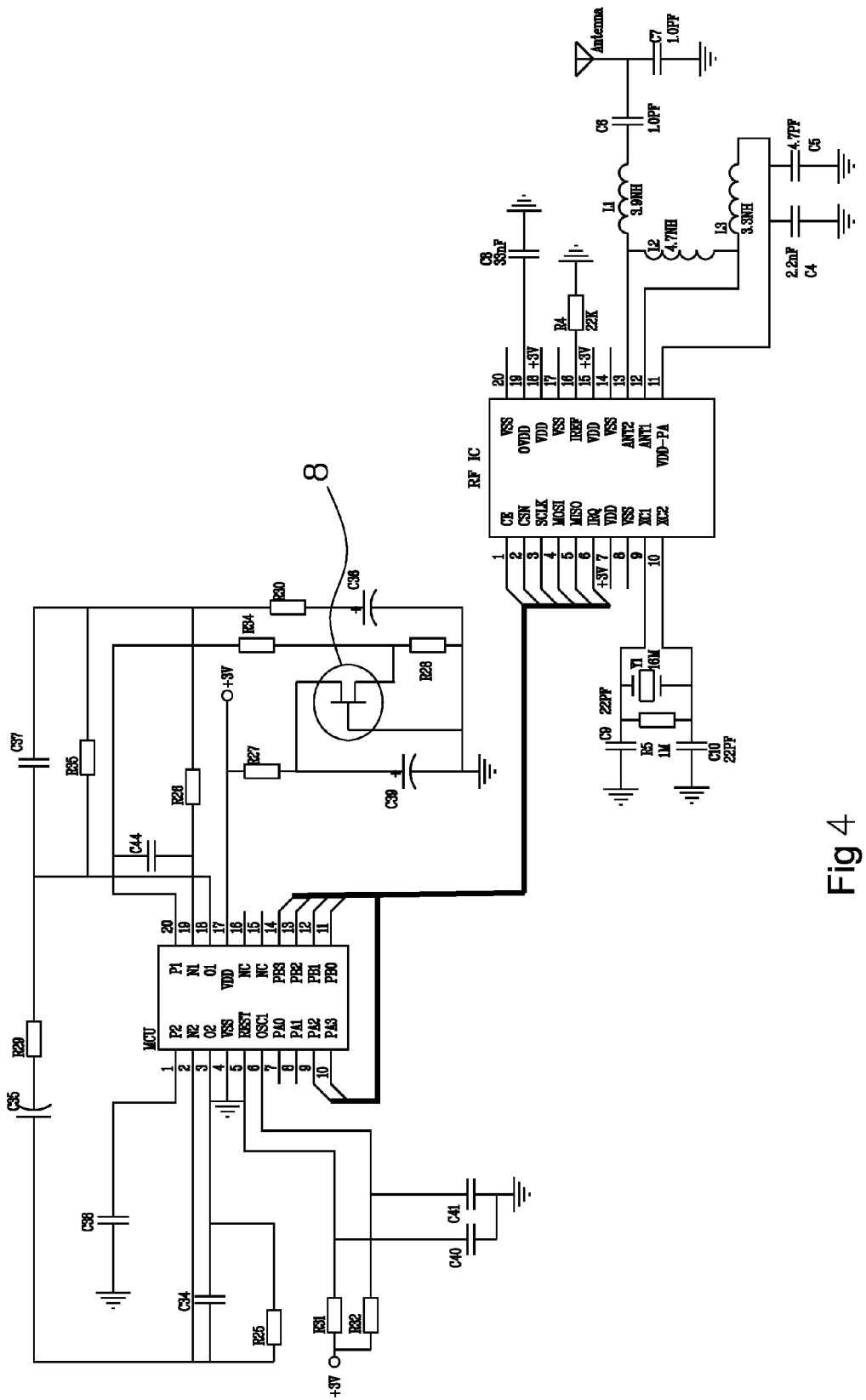
FIG. 4 is a schematic circuit diagram for the micro induction transmitter for human body of the embodiment of this invention.
Figure 5:
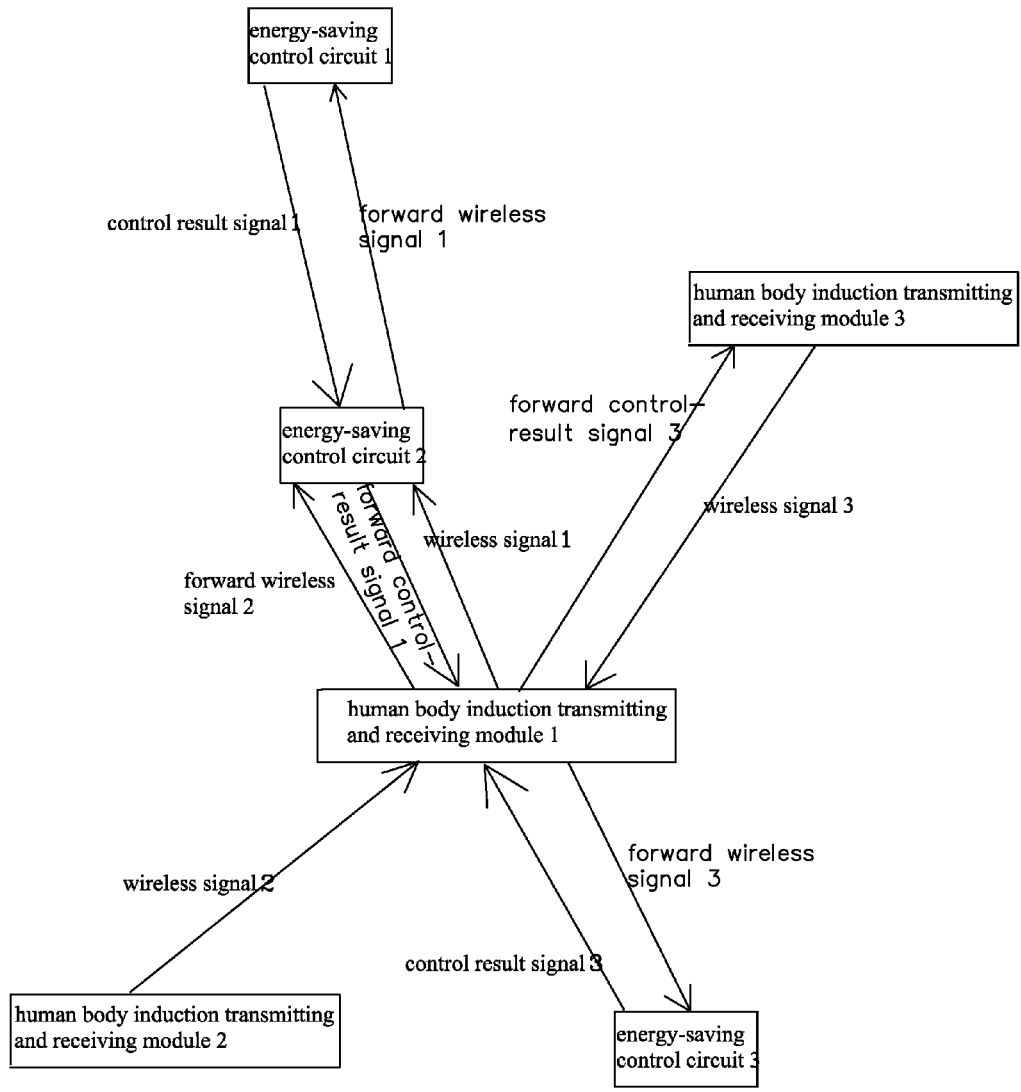
FIG. 5 is a schematic diagram for the network composed of the human body induction transmitting and receiving module and the wireless receiving and transmitting module.

This invention also provides a micro induction transmitter for human body for working with said energy-saving control circuit, said micro induction transmitter comprises a housing that may be made into the shape of a button or a small cylinder box, as shown in FIG. 2, In this embodiment, said housing consists of a hollow cylinder box 6 and a box cover 7, said housing encases a thermal-discharge infrared inductor 8, the induction connector of said thermal-discharge infrared inductor 8 is exposed outside of the box cover 7, the signal output port of said thermal-discharge infrared inductor 8 is connected to the signal input port of an induction signal processing module, the signal output port of said induction signal processing module is connected to a remote transmitting module at least capable of sending remote control signals, the remote transmitting module in this embodiment also adopts the wireless RF transmitting module with the existing 2.4 G frequency band; said induction signal processing module comprises an MCU processor, as shown in FIG. 4, the earth terminal of the thermal-discharge infrared inductor 8 is grounded, the signal output port of the thermal-discharge infrared inductor 8 is connected to the 34$^{th}$ resistor R34 and then to the 20$^{th}$ pin of the MCU processor, the power signal input port of the thermal-discharge infrared inductor 8 is connected to the 27$^{th}$ resistor R27 and then to the +3V DC power supply; pins 9~14 of the MCU processor are respectively connected to pins 1~6 of the wireless RF transmitting module, as shown in FIG. 4. The 32$^{nd}$ resistor R32, the 31$^{st}$ resistor R31, the 25$^{th}$ resistor R25, the 40$^{th}$ capacitor C40, the 41$^{st}$ capacitor C41, the 34$^{th}$ capacitor C34, the 38$^{th}$ capacitor C38, the 35$^{th}$ capacitor C35, the 29$^{th}$ resistor, the 37$^{th}$ capacitor C37, the 44$^{th}$ capacitor C44, the 26$^{th}$ resistor R26, the 35$^{th}$ resistor R35, the 30$^{th}$ resistor R30, the 36$^{th}$ capacitor C36, the 28$^{th}$ resistor R28 and the 39$^{th}$ capacitor C39 form the peripheral circuit of the MCU processor according to the connection shown in FIG. 4; besides, the circuit of the wireless RF transmitting module comprises a RF IC dedicated for 2.4 GHz, pins 1, 2, 3, 4, 5, 6 of the IC are respectively connected to pins 9, 10, 11, 12, 13, 14 of the MCU, the first crystal oscillator Y1, the 5$^{th}$ resistor R5, the 9$^{th}$ capacitor C9, the 10$^{th}$ capacitor C10 form the oscillation circuit of the RF IC; the 4$^{th}$ capacitor C4, the 5$^{th}$ capacitor C5, the 3$^{rd}$ inductor L3, the 2$^{nd}$ inductor L2, the 1$^{st}$ inductor L1, the 6$^{th}$ capacitor C6, the 7$^{th}$ capacitor C7 and the ANTENNA form the network for frequency selection and transmission of wireless signals of the RF IC; the 4$^{th}$ resistor R4 is connected to Pin 16 of the RF IC, the 8$^{th}$ capacitor C8 is connected to pin 19 of the RF IC. Then the wireless RF remote induction circuit is formed.

In this embodiment, the micro induction transmitter for human body is small and graceful, it can be easily attached on the bottom of the TV set or any other electrical appliance, when someone is moving within 15 m in front of the electrical appliance (in an angle of 140°), the thermal-discharge infrared inductor 8 inside the micro induction transmitter for human body will induce the unique infrared signals of human body, and then the signals will be processed by the MCU processor in the micro induction transmitter for human body, thus arousing the wireless RF transmitting module, which will transmit a series of wireless RF signals with fixed codes, at the same time, the wireless RF receiving module in the energy-saving control circuit will effectively receive such wireless RF signals as long as the signals are within 30 m indoor distance, after the wireless RF receiving module in the energy-saving control circuit receives the wireless RF signals, the microprocessor chip U2 will compare the codes, if compliant, the microprocessor chip U2 will export the signals to turn on the relay K1, making the electrical appliance in the standby status; at this time, the user may freely use the electrical appliance. If the user fails to start the electrical appliance after a long time in the standby status, and the thermal-discharge infrared inductor 8 no longer induces the existence of human before the appliance, the microprocessor chip U2 of the energy-saving control circuit will shut the relay K1.

The application of the induction transmitter for human body allows the user to start the appliance in only one step, which both complies with the habit users and saves the 2 m cord, moreover, it ensure harmonious and graceful appearance of home. The induction transmitter for human body adopts 3V coin battery and the thermal-discharge infrared inductor head, the MCU processor and the wireless RF transmitting module inside it adopts power-saving design, which ensures the inductor to work for over 3 years with the coin battery.

This power-saving control circuit may be designed into power-saving switch, power-saving socket, power-saving wiring board as well as other power-saving devices to be used for any electrical appliance with high standby power consumption.

As a further improvement, said remote induction circuit adopts a wireless transmitting and receiving module working with the human body induction transmitting and receiving module capable of wireless transmission and receiving; the remote transmitting and receiving module of the power-saving control circuit may also adopt the wireless transmitting and receiving module with the existing 2.4 G frequency band (or 433.92 MHz or 868 MHz or 315 Mhz) to make the neighboring power-saving control circuit or human body induction transmitting and the receiving module to communicate with each other to form the wireless RF remote induction circuit, which allows wireless signals to be transmitted to a longer distance despite of fade zones, it can also transmit the results for the execution of the power-saving control circuit back to corresponding human body induction transmitting and receiving module, the specific principle of the embodiment is as follows: each human body induction transmitting and receiving module and wireless transmitting and receiving module of power-saving control circuit is provided with a unique ID code, with will be transmitted each time the wireless signals are transmitted, when a neighboring power-saving control circuit or human body induction transmitting and receiving module receives such signals, their internal MCU will determine whether those signals belong to their own, if not, they will forward the signals by the wireless transmitting and receiving module of the power-saving control circuit or the human body induction transmitting and receiving module according to the original state, thus extending the scope of wireless transmission.

What is claimed is:

1. An energy-saving control circuit connected between an electrical appliance and a commercial power for turning on or off the power supply of the electrical appliance, comprising:
    a relay control circuit at least comprising a relay, two contacts of said relay connecting series the electrical appliance and commercial power for turning on or off the power supply of the electrical appliance;
    a main control module, a signal output port thereof is connected to a signal control port of said relay control circuit for exporting control signals to said relay control circuit for connecting or disconnecting the power supply of the electrical appliance;
    a power conversion module, an input port thereof is connected to the commercial power, an output port thereof is connected to a power input port of said main control module and an input port of said relay control circuit for generating DC power supply supplying said main control module and said relay control circuit;
    a circuit for collecting working current data, an input port thereof is connected to the electrical appliance for collecting real-time working current data of the electrical appliance, an output port thereof is connected to the main control module; wherein
    at least one remote induction circuit with feature of induction and features of transmitting and receiving remote signals, said remote induction circuit is connected to said main control module, the main control module according to the remote signals received by said remote induction circuit outputs control signals to said relay control circuit to connect or disconnect the power supply of the electrical appliance.

2. The energy-saving control circuit according to claim 1, wherein said circuit for collecting working current data comprises a constantan resistor and a current signal amplifying circuit, a first end of said constantan resistor is connected to a N-line of the commercial power after being connected to a fuse, a $2^{nd}$ end of said constantan resistor is connected to one contact of the relay in said relay control circuit, and other contact of said relay is connected to a N input port of the electrical appliance, a L input port of the electrical appliance is connected to L-line of the commercial power; two input ports of said current signal amplifying circuit are connected to an $1^{st}$ end and $2^{nd}$ end of said constantan resistor for amplifying the current through said constantan resistor, an output port of said current signal amplifying circuit is connected to an signal input port of said main control module.

3. The energy-saving control circuit according to claim 1, wherein said main control module comprises a micro controller with storage function, the control port of said relay is connected to the control signal output port of said micro controller.

4. The energy-saving control circuit according to any of claims 1, wherein said remote induction circuit is a wireless receiving module with wireless receiving ability working with an induction transmitter for human body.

5. The energy-saving control circuit according to claim 4, wherein said induction transmitter for human body comprises a housing being provided with an embedded thermal-discharge infrared inductor, a signal output port of said thermal-discharge infrared inductor is connected to a signal input port of an induction signal processing module, a signal output port of said induction signal processing module is connected to a remote transmitting module at least provided with the function of remote signal transmittance.

6. The energy-saving control circuit according to claim 5, wherein said remote transmitting module is a wireless RF transmitting module, said wireless receiving module adopts corresponding wireless RF receiving module to form the wireless RF remote induction circuit.

7. The energy-saving control circuit according to any one of claims 1, wherein said remote induction circuit is a wireless transmitting and receiving module working with an induction transmitter for human body and the remote induction circuit is capable of wireless transmission and receiving.

8. The energy-saving control circuit according to claim 7, wherein said induction transmitter for human body comprises a housing provided with a thermal-discharge infrared inductor, a signal output port thereof is connected to a signal input port of an induction signal processing module, a signal output port of thereof is connected to a remote transmitting module provided with transmitting function.

9. The energy-saving control circuit according to claim 8, wherein said remote transmitting module is a wireless RF transmitting module, correspondingly, said wireless receiving and transmitting module adopts wireless RF receiving and transmitting modules to form the wireless RF remote induction circuit.

10. The energy-saving control circuit according to claim 9, wherein said wireless receiving and transmitting modules can communicate with each other and form a network with each other.

11. The energy-saving control circuit according to any one of claims 1, wherein said remote induction circuit is a wireless transmitting and receiving module working with the human body induction transmitting and receiving module and provided with wireless transmitting and receiving functions.

12. The energy-saving control circuit according to claim 11, wherein said human body induction transmitting and receiving module comprises a housing provided with a thermal-discharge infrared inductor, the signal output port of which is connected to the signal input port of the induction signal processing module, the signal output port of which is connected to a remote transmitting and receiving module at least provided with transmitting and receiving functions.

13. The energy-saving control circuit according to claim 12, wherein said remote transmitting and receiving module is a wireless RF receiving and transmitting module, correspondingly, said wireless transmitting and receiving module adopts wireless RF receiving and transmitting module to form the wireless RF remote induction circuit.

14. The energy-saving control circuit according to claim 13, wherein said human body induction transmitting and receiving module and wireless transmitting and receiving module may communicate with and form a network with each other.

* * * * *